June 20, 1967  L. U. KIBLER  3,326,623
S-LENS CORRECTED FOR ABERRATIONS OF FOCUS
Filed Aug. 26, 1963
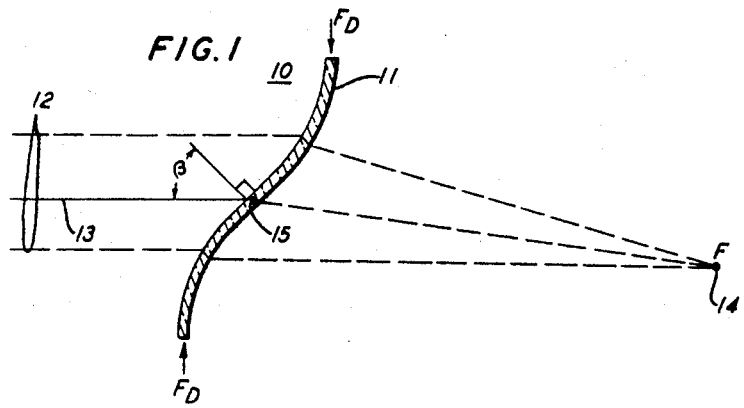
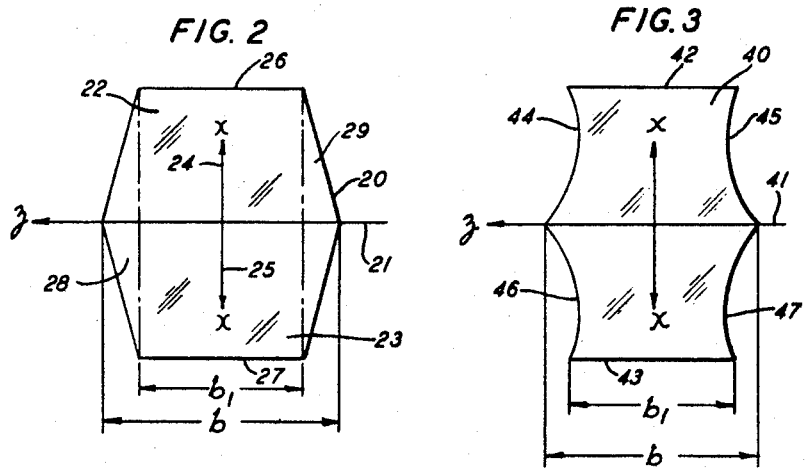
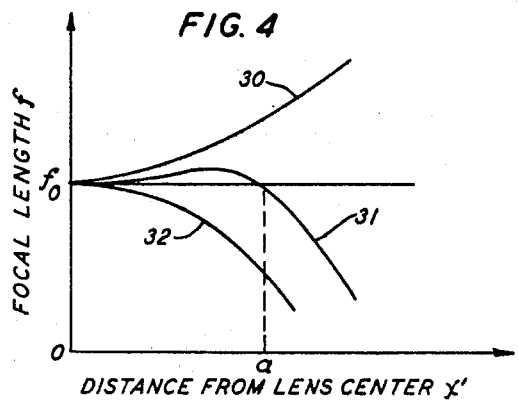
INVENTOR
L. U. KIBLER
BY
Kenneth W. Mature
ATTORNEY

3,326,623
S-LENS CORRECTED FOR ABERRATIONS OF FOCUS

Lynden U. Kibler, Middletown, N.J., assignor to Bell Telephone Laboratories, Incorporated, New York, N.Y., a corporation of New York
Filed Aug. 26, 1963, Ser. No. 304,401
3 Claims. (Cl. 350—189)

This invention relates to optical maser communication systems and, more particularly, to lenses for use in such systems.

In point to point transmission of signal bearing electromagnetic wave energy, there has recently been an expansion of the useful range of operating frequencies. This expansion has been made possible by the advent of a continuously operable maser capable of generating coherent radiation at or near optical wavelengths, as described in an article appearing in Physical Review Letters, February 1, 1961, at page 106, and entitled, "Population Inversion and Continuous Optical Maser Oscillations in a Gas Discharge Containing He-Ne Mixture," by A. Javan, W. R. Bennett, Jr., and D. R. Herriott. Continuously operating solid state optical masers are also available. Such continuously operating devices have considerably intensified the interest in transmitting signal information on a modulated "light beam."

With the opening up of the optical frequency, or micronwave, range as a useful frequency range for communication purposes has come the realization that many of the well known signal manipulation techniques and structures common in the lower millimeter wave and microwave frequency ranges are not applicable. Accordingly, new microwave techniques and associated structures have been devised. One such new structure is the warped dielectric, or "S," lens disclosed in the co-pending commonly assigned application of R. Kompfner, Ser. No. 161,591, filed Dec. 22, 1961, which issued as United States Patent 3,224,331 on Dec. 21, 1965. The S-lens disclosed there is a thin, low loss, long focus, lens of basically simple construction. Essentially, the lens is characterized by a sinusoidal or near sinusoidal surface curvature, and is illuminated over a relatively small area about a point corresponding to $n\lambda/2$ ($n=0,1,2 \ldots$) of the sinusoid. Focal lengths associated with such warped sheet lenses are of the order of hundreds or thousands of feet.

It has been found that the S-lens as priorly disclosed is characterized by certain beam aberrations, producing a situation in which all portions of a beam transmitted thereby do not meet at a common focal line. In many communication applications, such aberrations are undesirable.

It is therefore the object of the present invention to reduce the aberrations associated with S-lenses.

One method by which such aberrations can be eliminated involves grinding the surface of the flat dielectric plate in a manner producing, after deformation, a varying thickness of the warped S-lens, which variation corrects the aberration. However since the total deformations of the warped sheet are typically of the order of tens of mils, resulting in focal lengths of the order of hundreds to thousands of feet, the grinding tolerances involved to correct the aberrations through lens thickness variations would be exceedingly stringent. To impose such strict tolerances would eliminate one primary advantage of the S-lens, its extreme simplicity of construction.

Accordingly, it is a further object of the present invention to reduce S-lens aberrations in a manner which is simple, straightforward, and of practicable application.

It has been found in accordance with the invention that S-lens aberrations can be reduced by varying that dimension, of the dielectric sheet from which the lens is formed, which is perpendicular to the applied bending forces. This particular dimension, for the purposes of this specification, will be designated the lens width. More particularly, the lens width is varied from a given value at the opposite lens extremities at which the bending forces are applied to a maximum at the lens center. Thus, a dielectric sheet in accordance with the invention can be described as two similar trapezoidal portions having common wider bases.

According to a first specific embodiment of the invention, the lens width is varied linearly with distance to correct first order rectangular S-lens aberrations.

According to an additional embodiment of the invention, the lens width is varied nonlinearly with distance to correct both first order and higher order rectangular S-lens aberrations.

The above and other objects of the present invention, its nature and its various features and advantages, can be more readily understood from reference to the accompanying drawing and detailed description thereof which follows.

In the drawing:

FIG. 1 is a cross sectional view of an S-lens;

FIG. 2 is a plan view of a first S-lens embodiment in accordance with the present invention;

FIG. 3 is a plan view of a second S-lens embodiment in accordance with the invention; and FIG. 4 is a graphical representation indicating the reduction in lens aberration afforded by the invention.

Referring more particularly to FIG. 1, there is illustrated a warped dielectric, or S-, lens 10 comprising a sheet 11 of energy transparent dielectric material such as, for example, quartz or optical glass of which Corning No. 7056 is representative. Sheet 11 typically has a thickness of 5 to 100 mils. In the prior art form, the lens was formed by bending a rectangular sheet. In the invention, the lens is formed by bending a sheet of special configuration, such as is shown in FIGS. 2 and 3. Lens 10 is illuminated by rays 12 which are symmetrical about axis 13, said axis intersecting lens 10 at its center line of zero curvature. Sheet 11 is warped, or deformed, by the application of forces $F_D$ at opposite sheet extremities into an undulating member having a sinusoidal or near sinusoidal surface curvature. In a typical $x$, $y$, $z$ coordinate system such a configuration is represented by $y=\sin x/\beta$ over a range of values of $z$, where $\beta=\lambda/2\pi$. In focusing applications, the lens extent along $x$ is typically one half period, between $$x=\frac{\pi\beta}{2} \text{ and } x=\frac{3\pi\beta}{4}$$

with illumination about $x=\pi\beta$. Particular methods and means for deforming and for maintaining the desired configuration of lens 10 are disclosed in detail in the co-pending application of R. Kompfner referred to hereinbefore. Rays 12 are incident upon lens 10 with an angle of incidence $\beta$, corresponding to the Brewster angle, which is defined for a lens in air as the angle having a tangent equal to the index of refraction of the lens material. Reflections of energy incident upon a dielectric interface at the Brewster angle with its electric vector lying in the plane of incidence are theoretically zero. Thus light beam transmission losses can be substantially reduced by adhering to the Brewster angle condition at all dielectric interfaces. Rays 12 are refracted by lens 10 and are focused in the vicinity of a focal line represented in the cross sectional view of FIG. 1 as point 14. It is known, however, that, with the exception of the center line of lens 10, indicated by point 15 in FIG. 1, lens 10 does not focus an incident beam at a single focal line. Rather, the portions of the incident beam above and below the center line are focused beyond and before the focal line indicated by point 14. In general, the focal length of a rectangular S-lens as a function of the distance $x$ from the lens center can be expressed as $$f = f_0 \left[ 1 + A\left(\frac{X}{L}\right)^2 + B\left(\frac{X}{L}\right)^4 + \ldots \right]$$

where $f_0$ is the focal length at the lens center line, L is one half the lens aperture, and A and B are constants small compared to unity.

In accordance with the invention the constants A and B can be significantly reduced for lens illumination about the lens center.

FIG. 2 illustrates, in plan view, a dielectric sheet 20 having a configuration in accordance with the invention. Sheet 20 comprises a first trapezoidal portion 22 above center line 21 designated the $z$ axis, and a second trapezoidal portion 23 which is a mirror image of portion 22 below center line 21. Portions 22, 23 have a common broader base coincident with the $z$ axis. The lens extremities 26, 27, corresponding to the narrow bases of the trapezoidal lens portions have a width $b_1$, while the lens center along axis 21 has a width $b$. Between the center line and the lens extremities the width varies linearly as a function of dimension $x$ which is indicated by oppositely directed arrows 24, 25. In order to introduce focusing properties, a plane sheet having the shape of sheet 20 is warped into the S-lens configuration indicated in FIG. 1 by the application of forces applied at extremities 26, 27 and directed toward center line 21 in the manner indicated in FIG. 1. However, since dimensions $b_1$ are less than dimension $b$, the distribution of forces within the body of warped sheet 20 is significantly different from the force distribution for a rectangular sheet. From FIG. 2, it can readily be seen that trangular lens portions 28, 29 are subjected to no direct forces parallel to axis $x$ which result from the application of forces at the lens extremity. That is, all such forces within portions 28, 29 are resultant forces transmitted from adjacent regions. Accordingly, the deformation of sheet 20 occurs with boundary constraints different from those involved in the rectangular S-lens of the prior art. Therefore, when the ratio $b_1/b$ is in the range between 0.95 and 0.99, lens aberrations for illumination over the center of a lens having a focal length between $10^4$ and $10^5$ inches are significantly reduced.

A graphical representation of the effect of a lens width taper in accordance with the invention is given in FIG. 4, in which S-lens focal length $f$ is plotted along the ordinate as a function of distance from the lens center $x'$ plotted along the abscissa. In each of the three cases illustrated, the distance from the lens center is understood to be measured along a line perpendicular to the lens center line. Curve 30 is a plot of focal length vs. distance for a typical prior art rectangular warped dielectric sheet. Curve 30 indicates that, as the distance from lens center increases, the focal length increases from $f_0$. Thus different portions of a ray incident on the prior art lens will experience focusing at different locations, producing aberrations. Curve 31, on the other hand, is a plot of focal length vs. distance for an S-lens in accordance with the present invention. As can be seen from the curve, the effect of the lens width taper is to reduce the initial variation in focal length with distance and, up to a distance $a$ from the lens center, to restrict it within narrow bounds. Accordingly, the lens aberration is significantly reduced over an area of illumination of radius $a$, defined as that radius for which the lens focal length equals the paraxial focal length $f_0$. Beyond radius $a$, however, the focal length variation becomes greater per unit distance than was the prior art case. Thus, illumination is best confined to the area of radius $a$ or less. Typical values for $a$ are in the range of one inch. When the lens width taper is increased to situations in which the ratio of extremity width to lens center width falls below 0.95 for the particular focal lenth lens above, over correction occurs as indicated by curve 32, and aberrations, though reversed in sense, are not reduced.

Curves corresponding to those illustrated in FIG. 4 have been obtained for a dielectric sheet having a thickness of 0.01 inch, a total sheet deflection of 0.01 inch, and an associated $f_0$ of $2.8 \times 10^5$ inches. Such a sheet would typically be operative over a wide optical frequency range limited only by the loss properties of the dielectric material chosen.

The above linearly tapered lens width configuration corrects first order S-lens aberrations. In some cases, it may be desirable that second order aberrations be corrected. To do so in accordance with the principles of the invention, the lens width is tapered nonlinearly between the extremities of the lens and its center line. Thus, the lens edges would follow a curvilinear contour, and the effect would be to reduce the magnitude of the hump in FIG. 4 between $x'=0$ and $x'=a$.

In FIG. 3, such a configuration is illustrated as lens 40, comprising a plane sheet of optical material having a width $b$ along the $z$ axis 41 at the lens center and a width $b_1$ at the lens extremities 42, 43, which are at a distance $x=L/2$ from the $z$ axis. The curvature of each of tapered lens portions 44, 45, 46, and 47 can be expressed as, $$z = \frac{b}{2} + a_1 x + a_2 x^2$$

where $a_1$ is negative and has a magnitude greater than $$\frac{1}{L}(b + \sqrt{bb_1})$$

and $$a_2 = -\left(\frac{b-b_1}{2L^2} + \frac{a_1}{L}\right)$$

To produce focusing, sheet 40 is deformed into the S-shape of FIG. 1. As a typical example, a second order corrected lens with a ratio $b_1/b$ equal to 0.986 has a maximum beam aberration of 1.8% over an area of illumination of one inch radius. This is a significant improvement over the typical aberration of 4% or greater in simple rectangular S-lenses.

As disclosed in the co-pending commonly assigned application of R. Kompfner-E. A. J. Marcatili, Serial No. 287,420, filed June 12, 1963, now Patent No. 3,285,129, a point focusing system utilizing S-lenses requires three such lenses properly oriented with respect to the beam axis. The aberration-corrected lens embodiments described hereinabove would thus be substituted for each of the three focusing elements in a point focusing combination.

In all cases it is understood that the above described embodiments are illustrative of the principles of the present invention. Numerous and various other embodiments could be devised in accordance with these principles by those skilled in the art without departing from the spirit and scope of the invention.

What is claimed is:

1. A low loss dielectric lens for electromagnetic wave energy comprising a thin sheet of transparent material of constant thickness in the form of a pair of substantially identical trapezoidal portions having a common wider base of width $b$ defining the lens center line and separate narrow bases of width $b$, the ratio of the size of said narrow bases to the size of said wide base at said center line being between 0.95 and 0.99, said sheet being deformed into an element having first and second surfaces with substantially sinusoidal surface curvature by the application of forces perpendicular to said center line so that the variation in lens width will cause said lens to assume a curvature to correct for rectangular first order S-lens aberrations of focus.

2. The lens according to claim 1 in which the dimension of said portions in a direction parallel to said narrow bases and said wide base varies linearly as a function of its distance from said wide base.

3. The lens according to claim 1 in which the dimension of said portion in a direction parallel to said narrow bases and said wide base varies nonlinearly as a function of its distance from said wide base in accordance with the expression $$z = \frac{b}{2} + a_1 x + a_2 x^2$$

where $a_1$ is a negative constant and has a magnitude greater than $$\frac{1}{L}(b + \sqrt{bb_1})$$

and $$a_2 = -\left(\frac{b-b_1}{2L_2} + \frac{a_1}{L}\right)$$

where L is the lens aperture measured along a line perpendicular to said narrow bases, so that said lens assumes a curvature to correct rectangular second order S-lens aberrations of focus.

References Cited

UNITED STATES PATENTS 3,073,215  1/1963  Fischer _____ 88—57 X
3,224,331  12/1965  Kompfner.

JEWELL H. PEDERSEN, *Primary Examiner.*

JOHN K. CORBIN, *Examiner.*